United States Patent
Shahar et al.

[19]

[11] Patent Number: 5,847,398
[45] Date of Patent: Dec. 8, 1998

[54] GAMMA-RAY IMAGING WITH SUB-PIXEL RESOLUTION

[75] Inventors: Arie Shahar, Moshav Magshimim; Uri El-Hanany, Rehovot; Alex Tsigelman, Petac Tikva; Shimon Klier, Savion; Alexander Gorin, Rishon Lezion; Eldan Halberthal, Moshav Beit-Zait, all of Israel

[73] Assignee: Imarad Imaging Systems Ltd., Rehovot, Israel

[21] Appl. No.: 896,202

[22] Filed: Jul. 17, 1997

[51] Int. Cl.⁶ ............................. G01T 1/29; G01T 1/161
[52] U.S. Cl. .............................. 250/370.09; 250/370.13; 378/149
[58] Field of Search ............................ 250/370.09, 370.1, 250/370.13, 363.1, 369; 378/147, 149, 154, 146

[56] References Cited

U.S. PATENT DOCUMENTS

| | | |
|---|---|---|
| 3,011,057 | 1/1961 | Anger . |
| 3,793,520 | 2/1974 | Grenier . |
| 4,688,242 | 8/1987 | Ema . |
| 4,731,806 | 3/1988 | Takahata . |
| 4,761,802 | 8/1988 | Kiri . |
| 5,105,087 | 4/1992 | Jagielinski ...................... 250/370.09 |
| 5,173,608 | 12/1992 | Motomura et al. . |
| 5,340,988 | 8/1994 | Kingsley et al. . |
| 5,448,073 | 9/1995 | Jeanguillaume ..................... 250/363.1 |
| 5,666,395 | 9/1997 | Tsukamoto et al. ............... 250/370.09 |

OTHER PUBLICATIONS

H.H. Barrett, et al., Charge Transport in Arrays of Semiconductor Gamma–Ray Detectors, Physical Review Letters, vol. 75, No. 1, pp. 156–159, 1995.

J.D. Eskin, et al., The Effect of Pixel Geometry on Spatial and Spectral Resolution in A CdZnTe Imaging Array, IEEE Nuclear Science Symposium and Medical Imaging Conference Record, vol. 1, P.A. Moomer Ed., pp. 544–548, 1995.

*Primary Examiner*—Edward J. Glick
*Assistant Examiner*—Darren M. Jiron
*Attorney, Agent, or Firm*—Darby & Darby

[57] ABSTRACT

A gamma ray imaging system for providing high resolution images includes a collimator plate with an array of multiple holes which image a gamma emitting object onto a semiconductor gamma detector pixel array coupled to a signal processor. The collimator holes are smaller than half the pixel pitch. The detector array is moved in steps, with a step-size equal to the pitch of the collimator holes, to successive imaging positions. The hole locations and imaging positions are such that gamma photons do not fall on the dead areas of the pixels. An electronic processing unit constructs from the pixel signals produced at each imaging position, a set of independent equations and solves them to derive the exact image signal of each irradiated area, and uses this data to compose and a display a high resolution gamma image of the object.

33 Claims, 8 Drawing Sheets

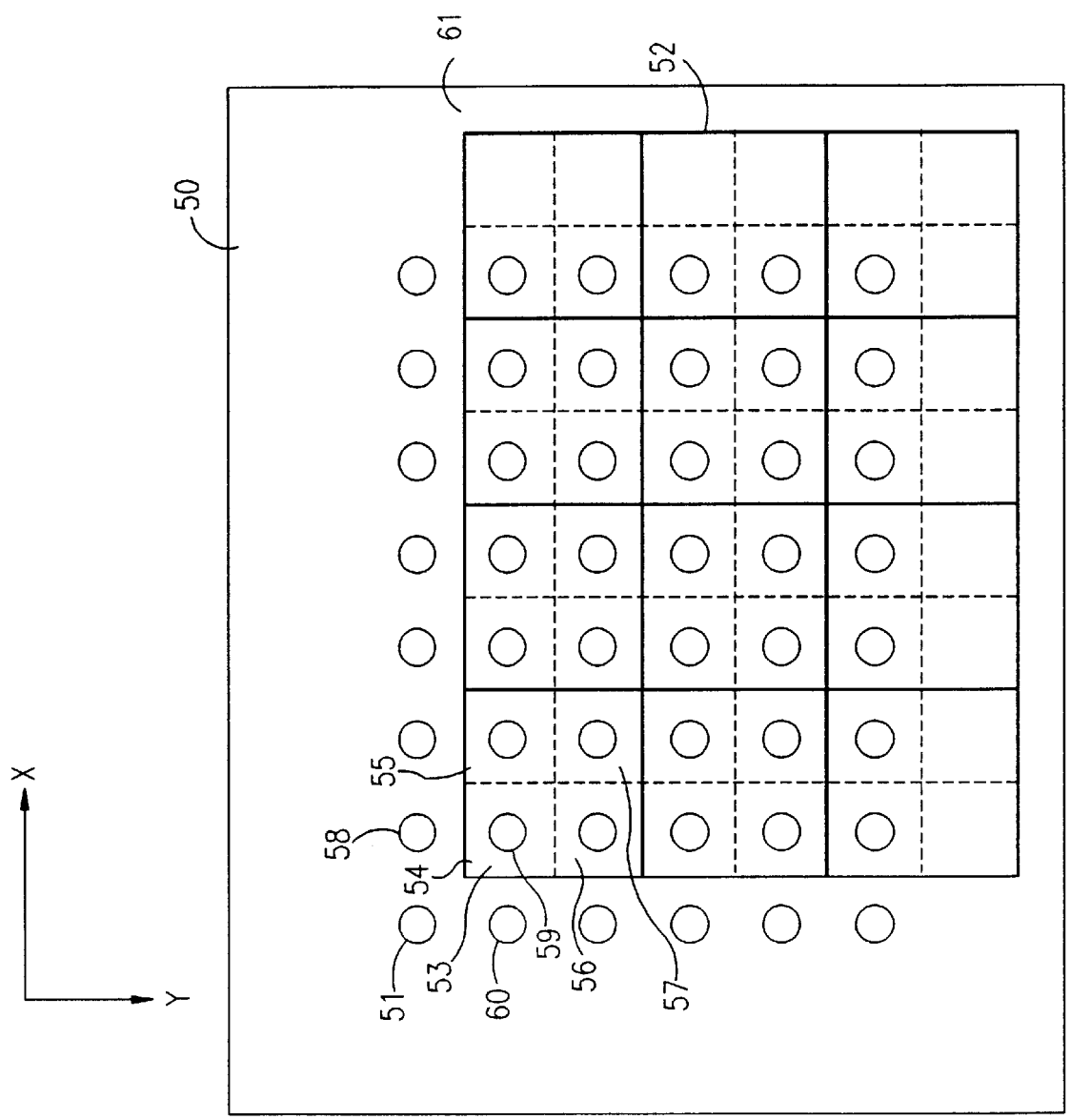

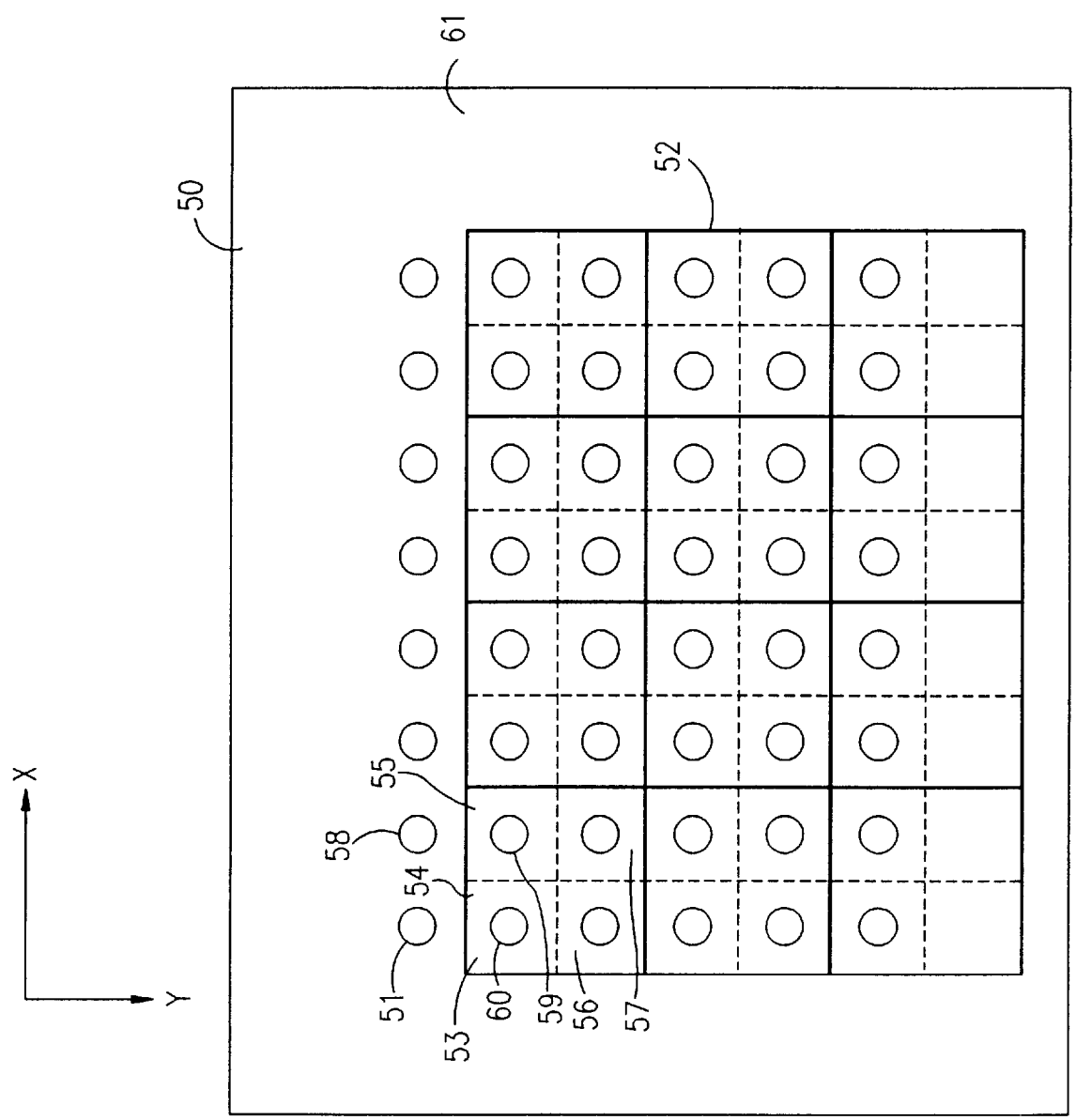

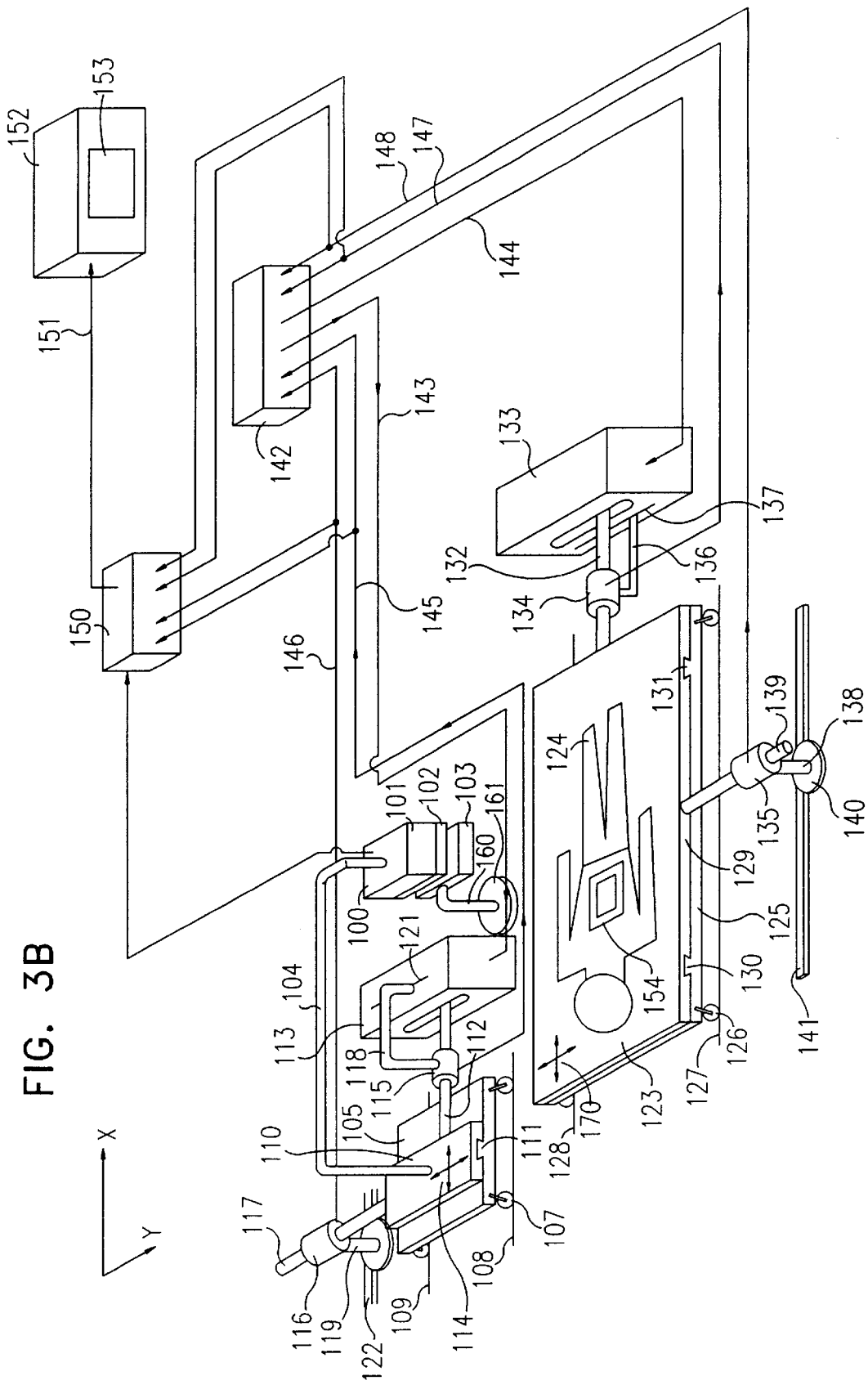

GAMMA-RAY IMAGING WITH SUB-PIXEL RESOLUTION

FIELD OF THE INVENTION

The present invention relates to gamma-ray imaging imaging in the field of nuclear medicine.

BACKGROUND OF THE INVENTION

The generally used current technology for gamma-ray imaging in the field of nuclear medicine is the Anger camera of the type described in U.S. Pat. No. 3,011,057. Such a camera is divided into two basic parts: the collimator and the detector. The collimator absorbs those rays not emitted in a specific direction defined by the collimator openings, and thereby makes it possible to obtain a defined image from the omnidirectional gamma rays emitted from the object over a complete solid angle. The detector, located behind the collimator, comprises a scintillator for converting the gamma rays into visible photons, and a photomultiplier or photodetector array for converting these photons into electrical signals representing the image.

The idea of dispensing with the scintillator and using a pixelated imaging plane consisting of multiple cells of semiconductor detector arrays for direct detection of gamma ray radiation is known in the art. One of the most recent examples of this technology is shown by H. H. Barrett, J. D. Eskin and H. B. Barber, in the article "Charge transport in arrays of semiconductor gamma-ray detectors", *Phys. Rev. Let.*, vol. 75, no. 1, pp. 156–159, 1995. They demonstrated this technology using CdTe or CdZnTe semiconductor detectors arranged in a configuration of arrays of modular detector assemblies.

This pixelated semiconductor direct detection technology has many advantages over the Anger camera technology, as follows:

1) Direct detection of the high energy photons without the need for intermediate energy conversion by the scintillator crystal.
2) Higher spatial resolution because of the direct determination of the location of the absorbed photon, without the need to calculate this location by deriving the center of gravity of the light intensity emitted from the scintillator crystal.
3) An appreciably higher stopping power than that achieveable with a scintillator crystal, due to the high atomic number of the semiconductors used.
4) Better spatial resolution, because of the better energy resolution used for the rejection of photons that suffer Compton scattering in the measured object.
5) A higher count rate due to parallel processing of the signals from the multiple pixels, without the dead time present for each single event with the scintillator crystal.

It is known in the art that the performance of an imaging system can be improved by acquiring multiple images while moving the camera in a step motion. For example:

U.S. Pat. No. 4,731,806 has a moving grid for eliminating scattered X-rays. U.S. Pat. No. 4,688,242 uses a moving mask for determining the background scattered X-ray level in the system, which is to be subtracted from the acquired image. U.S. Pat. No. 5,173,608 describes a method of correcting the positional shift of a Gamma camera system. U.S. Pat. No. 4,761,802 describes an apparatus for multiple beam X-ray scanning. U.S. Pat. No. 3,793,520 has a collimator with multiple openings having different depths of focus, to produce images at different depths while moving the collimator.

U.S. Pat. No. 5,340,988 describes an image detection assembly with a photosensitive pixel array which is moved between a number of sequential imaging positions according to a predetermined imaging cycle. By storing the multiple images acquired at the different locations, over-sampling is achieved. A deblurring filter (such as that used to stabilize images affected by camera shake) is applied to the stored data in order to electronically refer images acquired at the shifted positions back to the original position where the first image was acquired. This combination of over-sampling and the use of a deblurring filter produces non-aliased high resolution images, having resolution better than that of the optical sensor array.

A system of the type described in U.S. Pat. No. 5,340,988 is useful in x-ray imaging systems, with have high photon fluxes, and which generally use a scintillator crystal and photodetector array. Such a system is not, however, suitable for gamma ray (and hard X-ray) imaging using direct detector arrays, for the following reasons:

1. The system described does not include a collimator. For x-ray use, where the radiation is emitted effectively in straight lines from the source, through the object to the imaging system, a collimator is not needed. For gamma ray applications, the photons from the measured object are emitted in a non-collimated manner in all orientations. In this situation the photons absorbed in the scintillator do not properly construct the image projection of the measured object, and a collimator must be placed in front of the scintillator for proper image production.
2. In the field of gamma ray imaging, because of the low flux of photons, single event measurements are required to count the photons detected. Furthermore, some of the photons emitted by the object suffer Compton scattering in the emitter's volume, which changes their orientation and reduces their energy. If the image is constructed including these Compton scattered photons, the spatial resolution is degraded, since such photons carry misleading information about the location from where they were emitted. Therefore, the use of energy rejection techniques is essential to exclude those photons whose energy has been decreased through Compton scattering.

In the embodiment shown in the above prior art, the pixel size is small (100 $\mu$m), and the dead area between neighbouring pixels insignificantly small (a few $\mu$m). For a direct detector array used to detect single-event-based gamma ray images, the dead area becomes much larger, as will be shown below, with very significant consequences for the measurement technique.

The high energy photons detected by the array are absorbed in the detector volume, and create a relatively large cloud of electon/hole charge pairs, depending on the photon energy. In the region between pixels, the electric field is distributed symmetrically between the two pixels. Therefore, the charge cloud is shared between the two pixels, resulting in a low collection efficiency for each of them. Poor charge collection implies low photon energy, which may then fall below the threshold of the energy rejection system mentioned above. This means that photons falling in the area between two pixels may not be counted in building the image, and this may lead to an innaccurate image. The regions between the pixels are therefore useless for gamma photon detection, and are known as dead areas. Since the above mentioned charge cloud is relatively large, the size of the dead area is also large.

Since no provision is made in the above prior art to ensure that at every step position, the dead areas are prevented from receiving any incident photon radiation from the collimator holes, and since step size defined in the motion program is always a fraction of the pixel pitch, an imaged area which in a previous step was fully included in the active area of one pixel is projected in the following step so that it overlaps two pixels. Part of its photons therefore fall on the dead area, which is large for gamma ray detection. This means that the electrical response of the detector effectively changes, and is dependent on the step location of the imaging system. Thus, when used for gamma ray imaging, the above prior art introduces innaccuracies and a high noise level, unacceptable for a system whose object is to improve the image quality in a medical imaging system.

In U.S. Pat. No. 5,448,073, Jeanguillaume describes an Anger camera having a collimator with large openings—at least twice the intrinsic resolution of the detector. The flux of photons reaching the scintillator crystal is therefore high, resulting in significantly improved sensitivity. For improving the collimator resolution, Jeanguillaume proposes that multiple images be acquired at stepped positions of the detector, the step size being of the order of magnitude of the predetermined image resolution, and the images so obtained being stored for signal processing. The ultimate image resolution cannot, however, be selected at any predetermined level, as suggested by Jeanguillaume, since there is a physical limit to the image resolution set by the system configuration.

For collimator plate imaging systems, a system virtual pixel can be defined as being the region on the imaging plane irradiated by the field of view of one collimator hole. Expressed mathematically, the size of the virtual pixel is equal to the convolution of the collimator resolution with the intrinsic detector resolution. Each acquired image is constructed from pixels (virtual pixels of the complete system) containing only part of the information of the corresponding shifted pixel of the previous image, combined with new information that did not exist in those shifted pixels of the previous image. In the situation existent in U.S. Pat. No. 5,448,073, this means that when acquiring the next image, the detector must be shifted by an amount equal to or bigger than the intrinsic resolution of the detector. Use of steps smaller than the intrinsic detector resolution is worthless, since such steps do not contribute any new information to enable improvement of either the intrinsic resolution or the collimator resolution. It is this limitation that dictates the minimum opening of the collimator holes as being at least twice the internal resolution. This minimum diameter for the collimator holes is derived from the constraint that it be an integer number times the size of the minimum incremental step, which has been shown to be equal to the internal resolution. For the integer 1, there is no independent information between successive multiple images. Accordingly, the minimum value for the integer number is two, resulting in a collimator whose minimum opening diameter in proximity to the detector is at least twice the intrinsic resolution of the detector, as described in the patent in column 2, lines 36 to 38.

The best resolution that can be achieved with the above mentioned technique is therefore equal to the size of an increment of the step motion of the camera in which the different images are acquired. This means that the best resolution that can be achieved is equal to the internal resolution of the detector. Accordingly it is clear that using this technique there is only an improvement in the sensitivity of the collimator, whereas the resolution, because of the large collimator hole size, is limited to the intrinsic resolution of the detector.

Signal processing techniques used in the prior art, such as in U.S. Pat. No. 5,340,988, are based on the use of Wiener filter functions for deblurring the data sets, and inverse Fourier transforms for solving the data matrices. These techniques are used because of their intrinsic speed, and the economy in processing power required for execution. They are however approximation methods, and result in a number of disadvantages over the more rigorous exact solution methods. These disadvantages arise as follows:

The Weiner filter, like any other digital filter, is a sliding filter, and as such has a delay equal to half the filter length, which means that the image constructed with this deblurring filter is also shifted by the same amount. The magnitude of this shift is equal to the virtual pixel size times half the number of coefficients of the filter. The number of coefficients of the filter is equal to the square of the number of shifting steps needed to produce a total shift equal to the pixel pitch. The importance of a precise image position in medical diagnostics means that this image shift is a severe disadvantage of the signal processing methods used in the prior art.

The deblurring filter also has a non-ideal spectral response and phase shift in the spatial frequency regime, resulting in deviated signal values for the virtual pixels processed using this technique.

Furthermore, in solving for the value of the signals developed on the virtual pixels, the prior art uses an arbitrary approximation for the function $F(W_x, W_y)$ which is the Fourier transform of f (m,n), the point spread function (the impulse response) of the imaging system. This is expressed mathematically in equation 1–3 in U.S. Pat. No. 5,340,988, by adding a large and arbitrary positive constant, a, to the denominator of the above equation. The purpose of adding this constant is to reduce the frequency noise produced by the singularity that causes this frequency to be strongly amplified at twice the Nyquist frequency corresponding to the pixel pitch. The constant, a, strongly reduces the amplification at higher spatial frequencies, thereby reducing the high frequency noise. This however, results in a smearing of the image, and a major degradation in the image contrast. This is unacceptable for nuclear medical imaging applications, since many of the important diagnostic techniques are based on the image contrast.

In addition, the prior art has no arrangements for cancelling the above mentioned dead area noise. This has a fundamental harmonic close to the problematic frequency of twice the Nyquist frequency because it arises at the boundaries between neighbouring pixels, and therefore has a period equal to the pixel size. Reduction of this noise requires the use of a large value of the constant, a, causing a strong averaging or smearing effect, as noted above.

It is therefore apparent that the reconstruction of a high resolution image using the processing techniques of the prior art produces an output which suffers from image shifting, image distortion and contrast degradation, as well as the dead area noise previously mentioned. Therefore, the advantages of the speed and computational efficiency of this technique are largely lost when applied to medical gamma imaging technology.

From the above discussion, it is clear that a gamma camera based on pixelated semiconductor detector technology, with an improved intrinsic resolution and an accurate processing technique would have significant advantages over the prior art.

The discussion below is a review of some of the performance characteristics of a pixelated semiconductor detector, especially in relation to the intrinsic resolution obtained when used in a Gamma camera.

Some properties of the semiconductor detector cell improve with increase of the pixel size, as follows:
1) Collection efficiency: the ratio between the cross-talk signal which diffuses in and out of the cell and the primary signal inside the cell is proportional to the ratio between the side-wall area of the cell and its volume. This ratio goes down with pixel size, and thus the collection efficiency increases with pixel size.
2) Stopping power: the radiation absorption in the detector crystal and thus its sensitivity increase with cell thickness and area.

Other properties of the semiconductor detector cell improve with reduction of the pixel size, as follows:
1) Signal to noise ratio: The noise generated by the cell increases with its leakage current and its capacitance. Both the leakage current and the capacitance of the cell decrease with decreased pixel size, and thus the S/N ratio improves with decreased pixel size.
2) Energy resolution: due to an effect known as the "small pixel effect", the energy resolution is improved with reduction in pixel size, since the main contribution to the electrical signal produced by the detector is from charge carriers having higher values of the product $\mu\tau$, where $\mu$ is the mobility of the charge carriers and $\tau$ is their life-time. This effect is shown by J. D. Askin, H. H. Barrett, H. B. Barber and J. M. Woolfenden, in "The effect of pixel geometry on spatial and spectral resolution in a CdZnTe imaging array" published in IEEE Nuclear Science Symposium & Medical Imaging Conference Record, Vol. 1, P. A. Moomer Ed., pp. 544–548, 1995.

Based on the above factors, a good all-round compromise for gamma camera use is an aspect ratio of about one half between pixel size and cell thickness.

However, other practical limitations can make it difficult to use a pixel size optimised according to one or other of the above limits. One such major limitation is set by the practical size of integrally packaged detector-IC combinations available using the latest semi-conductor packaging technologies. The use of an on-board IC for amplifying and processing the detector output signal is essential for providing high sensitivity, low S/N, fast-processed signals. Semiconductor modular-detectors such as CdTe and CdZnTe arrays, can be obtained integrated with "chip on board" IC's. The "chip on board" includes one or more ASIC (Application Specific Integrated Circuit) having a separate channel for each detector cell. Each channel includes a low noise charge sensitive preamplifier and other analog and digital features. To enable the modular detectors to be combined to form one large continuous imaging-plane, the size of the "chip on board" must be equal or smaller than the individual module size of the detector. This requirement determines the minimum size of pixel as being equal to the minimum area required per single channel signal amplifying and processing circuit on the ASIC substrate including all its interconnections.

On the other hand the maximum pixel size which can be used in an imaging system Is determined by the requirements of the system's resolution, which degrades with increasing pixel size, as mentioned above.

With current "chip on board" packaging technology, the minimum pixel size is about 2.5×2.5 mm. For some medical applications, such as mammography and thyroid scintography, it is important to achieve resolution better than 2.5×2.5 mm. Such resolution cannot be achieved with modular detectors using the currently known technology. Therefore, it is important to devise an imaging method which will improve the resolution beyond the limits set by current detector technology limitations, as mentioned above.

SUMMARY OF THE INVENTION

The present invention seeks to provide, by means of successive predetermined imaging positions, a gamma ray imaging method with intrinsic image resolution improved so as to be better than the pixel size of the array of semiconductor modular detectors in the camera, and with an image free of imaging shift, image distortion, contrast degradation and dead area noise.

There is thus provided in accordance with a preferred embodiment of the present invention, a gamma ray imaging system with sub-pixel resolution, comprising a collimator plate located in front of the imaging plane such that the area of each pixel in the imaging plane contains multiple holes of the collimator plate. The holes in the collimator plate are smaller than the pixels in the imaging plane and are arranged with a spatial periodic structure such that each spatial period of the pixel structure in the imaging plane contains several periods of the hole structure in the collimator plate. Each hole in the collimator plate produces an irradiated region on a pixel in the imaging plane and defines a virtual pixel area on the real pixel. Each real pixel contains several virtual pixels.

In order to achieve sub-pixel resolution, the imaging plane is moved relative to the collimator plate between successive predetermined imaging positions separated by a distance smaller than the pixel size. In order to overcome the dead area noise problem, this movement is made in such a way that each virtual pixel, as defined by the projection of a collimator hole onto the imaging plane, always falls within the active area of a real pixel, and not in the dead area at the edges of the pixels.

Alternatively, the collimator plate is fixed in the camera relative to the imaging plane, and the whole camera is moved relative to the measured object. Since each collimator hole images a different part of the object, this movement too causes relative movement of the image with respect to the imaging plane. In this case too, the relative positions of the collimator plate and imaging plate are such that each virtual pixel always falls within the active area of a real pixel, and not in the dead area at the edges of the pixels.

In order to achieve the above objectives, the multiple holes in the collimator plate are equally spaced from each other by a distance equal to or greater than twice the width of the dead area at the edge of each of the pixels, and are spaced from the boundary line between the pixels by half the distance between the holes. Furthermore, the distance between each successive predetermined imaging position is made equal to the pitch of the collimator plate holes. This ensures that in any imaging position, the dead area will always be screened from irradiation, whether there is relative movement between the collimator and the pixelated detector, or not.

All the virtual pixels that belong to a specific real pixel are measured together and are summed to produce the real pixel signal. Therefore, the individual signal data from each of the virtual pixels is not immediately retrievable. In order to retrieve this information, use is made of the images acquired at the different imaging positions, either of the imaging plane relative to the collimator plate, or of the whole camera relative to the measured object. By correlating between these images and the positions at which they were acquired, a set of independent mathematical equations can be constructed, equal in number to the number of irradiated regions. This array of equations can be solved exactly by mathematical methods, and hence the signal developed on each virtual pixel derived. From these signals, an image with sub-pixel resolution can be simply constructed. This image preserves the exact values for each pixel, and unlike the prior art embodiments, does not suffer from position shifting, contrast degradation or dead area noise.

Additionally, in accordance with another preferred embodiment of the present invention, there is provided a gamma-ray imaging system for producing high resolution images, including:

(a) a collimator plate having multiple holes for collimating gamma photons emitted from an object to be imaged, (b) a gamma detector pixel array located in an imaging plane, including a plurality of pixels having predetermined pitch between pixels, each pixel operative to convert the gamma photons directly into electrical signals which comprise the image data, said multiple holes in the collimator plate being smaller in diameter than half the pitch between the pixels, and being arranged in a spatial periodic structure such that the pitch of the pixel structure contains two or more periods of the collimator hole structure, (c) an actuator for producing relative movement between the object to be imaged and the gamma detector pixel array in the imaging plane, to successive predetermined imaging positions, the distance between each successive predetermined imaging position being equal to the pitch of the spatial periodic structure of the holes in the collimator plate, (d) an electronic controller for controlling the relative movement between the object to be imaged and the gamma detector pixel array according to a predetermined program, the multiple holes and successive predetermined imaging positions being arranged so that the photons emerging from each hole at each imaging position produce discrete multiple irradiated regions on the pixels outside the dead areas at the edges of the pixels, (e) an electronic signal measurer for measuring at each successive predetermined imaging position the electrical signals produced by the pixels of the gamma detector pixel array, and (f) an electronic processing unit for processing the electrical signals produced by the pixels of the gamma detector array at each successive predetermined imaging position, and thereby constructing a set of independent equations equal to the number of irradiated regions, and accurately solving the set of independent equations to derive the data value of the electrical signals corresponding to each of the irradiated regions, and using the data to compose and display an image of the object.

Additionally, in accordance with another preferred embodiment of the present invention, there is provided a gamma-ray imaging system for producing high resolution images wherein the electronic system measures the electrical signals produced by the pixels by in means of single photon counting corresponding to a predetermined energy range.

Additionally, in accordance with another preferred embodiment of the present invention, there is provided a gamma-ray imaging system for producing high resolution images wherein the collimator plate has borders without holes.

Additionally, in accordance with another preferred embodiment of the present invention, there is provided a gamma-ray imaging system for producing high resolution images wherein the object is a human body after treatment with a gamma emitting tracer material.

Additionally, in accordance with another preferred embodiment of the present invention, there is provided a gamma-ray imaging system for producing high resolution images wherein the imaging plane comprises arrays of modular detectors assemblies.

Additionally, in accordance with another preferred embodiment of the present invention, there is provided a gamma-ray imaging system for producing high resolution images wherein each modular detector includes a "chip on board" package comprising at least one ASIC.

Additionally, in accordance with another preferred embodiment of the present invention, there is provided a gamma-ray imaging system for producing high resolution images wherein the detector material is CdTe or CdZnTe.

Additionally, in accordance with another preferred embodiment of the present invention, there is provided a gamma-ray imaging system for producing high resolution images wherein the actuator for producing relative movement comprises a motor.

Additionally, in accordance with another preferred embodiment of the present invention, there is provided a gamma-ray imaging system for producing high resolution images wherein the actuator for producing relative movement does so when the collimator plate is attached to the camera so that it moves together with the imaging plane.

Additionally, in accordance with another preferred embodiment of the present invention, there is provided a gamma-ray imaging system for producing high resolution images wherein the actuator for producing relative movement does so when the object is in a static position, or when the imaging plane is in a static position, or when the imaging plane and the object are both moving.

Additionally, in accordance with another preferred embodiment of the present invention, there is provided a gamma-ray imaging system for producing high resolution images wherein the actuator for producing relative movement does so when the collimator plate is kept in a static position.

Additionally, in accordance with another preferred embodiment of the present invention, there is provided a gamma-ray imaging system for producing high resolution images wherein the actuator for producing relative movement does so when the object is in a static position, or when the imaging plane is in a static position, or when the imaging plane and object are both moving.

Additionally, in accordance with another preferred embodiment of the present invention, there is provided a gamma-ray imaging system for producing high resolution images wherein the relative movement is controlled by a closed loop electronic control system, which may include a position reader that feeds a controller for controlling the actuator for producing relative movement.

Additionally, in accordance with another preferred embodiment of the present invention, there is provided a gamma-ray imaging system for producing high resolution images wherein the actuator for producing the relative movement includes a moveable platform, which can be arranged to carry a human body.

Additionally, in accordance with another preferred embodiment of the present invention, there is provided a gamma-ray imaging system for producing high resolution images wherein the relative movements are produced by means of discrete step motion or continuous motion between successive predetermined imaging positions.

Additionally, in accordance with another preferred embodiment of the present invention, there is provided a gamma-ray imaging system for producing high resolution images wherein the path of the relative movement between the object to be imaged and the gamma detector pixel array is repeated periodically and the resultant images integrated in order to improve signal to noise ratio, and to average out time-independent phenomena. Additionally, in accordance with another preferred embodiment of the present invention, there is provided a gamma-ray imaging system for producing high resolution images wherein the set of independent equations is solved numerically, either by a microprocessor or by a computer. Additionally, in accordance with another preferred embodiment of the present invention, there is provided a gamma-ray imaging system for producing high resolution images wherein a region of interest is defined on the object.

Additionally, in accordance with another preferred embodiment of the present invention, there is provided a gamma-ray imaging system for producing high resolution images wherein the region of interest is defined by the window of a frame placed between the object and the collimator plate in the vicinity of the object, which frame could be made of lead.

Additionally, in accordance with another preferred embodiment of the present invention, there is provided a gamma-ray imaging system for producing high resolution images wherein the signals of the irradiated regions are corrected in the processing unit to compensate for the time that they are screened by the borders of the collimator-plate.

Additionally, in accordance with another preferred embodiment of the present invention, there is provided a gamma-ray imaging system for producing high resolution images including:

(a) a collimator plate having multiple holes for collimating gamma photons emitted from an object to be imaged, (b) a gamma detector pixel array located in an imaging plane, including a plurality of pixels having predetermined pitch between pixels, each pixel operative to convert the gamma photons directly into electrical signals which comprise the image data, the multiple holes in the collimator plate being smaller in diameter than half the pitch between the pixels, and being arranged in a spatial periodic structure such that the pitch of the pixel structure contains two or more periods of the collimator hole structure;

(c) an actuator for producing relative movement between the object to be imaged and the gamma detector pixel array in the imaging plane to successive predetermined imaging positions, the distance between each successive predetermined imaging position being equal to an integral number times the spatial period of the pixel structure, (d) an electronic controller for controlling the relative movement between the object to be imaged and the gamma detector pixel array according to a predetermined program, the multiple holes and successive predetermined imaging positions being arranged so that the photons emerging from each hole at each imaging position produce discrete multiple irradiated regions on the pixels outside the dead areas at the edges of the pixels, (e) an electronic signal measurer for measuring at each successive predetermined imaging position the electrical signals produced by the pixels of the gamma detector pixel array, and (f) an electronic processing unit for processing the electrical signals produced by the pixels of the gamma detector array at each successive predetermined imaging position, and thereby constructing a set of independent equations equal to the number of irradiated regions, and accurately solving the set of independent equations to derive the data value of the electrical signals corresponding to each of the irradiated regions, and using the data to compose and display an image of the object, the images acquired at each successive predetermined position being summed and averaged after being referred back electronically to their initial reference positions.

Additionally, in accordance with another preferred embodiment of the present invention, there is provided a gamma-ray imaging system for producing high resolution images including:

(a) a collimator plate having multiple holes for collimating gamma photons emitted from an object to be imaged, (b) a gamma detector pixel array located in an imaging plane, including a plurality of pixels having predetermined pitch between pixels, each pixel operative to convert the gamma photons directly into electrical signals which comprise the image data, the multiple holes in the collimator plate being smaller in diameter than half the pitch between the pixels, and being arranged in a spatial periodic structure such that the pitch of the pixel structure contains two or more periods of the collimator hole structure, (c) an actuator for producing relative movement between the object to be imaged and the gamma detector pixel array in the imaging plane to successive predetermined imaging positions, the distance between each successive predetermined imaging positions being equal to the pitch of the spatial periodic structure of the holes in the collimator plate, (d) an electronic controller for controlling the relative movement between the object to be imaged and the gamma detector pixel array according to a predetermined program, the multiple holes and successive predetermined imaging positions being arranged so that the photons emerging from each hole at each imaging position produce discrete multiple irradiated regions on the pixels outside the dead areas at the edges of the pixels, (e) an electronic signal measurer for measuring at each successive predetermined imaging position the electrical signals produced by the pixels of the gamma detector pixel array, (f) an electronic processing unit for processing the electrical signals produced by the pixels of the gamma detector array at each successive predetermined imaging position, and thereby constructing a set of independent equations equal to the number of said irradiated regions, and accurately solving the set of independent equations to derive the data value of the electrical signals corresponding to each of the irradiated regions, and using the data to compose and display an image of the object, and (g) a rotator for rotating the gamma detector array about an axis through its center operative to acquire images at positions rotationally shifted relative to each other by 90 degrees, the images being summed and averaged after being referred back electronically to their initial reference position.

BRIEF DESCRIPTION OF THE DRAWINGS

The present invention will be understood and appreciated more fully from the following detailed description in which:

FIGS. 2a to 2d illustrate the different relative shifts between the collimator plate and the imaging plane used for deriving sub-pixel resolution.

FIGS. 3a and 3b show schematic configurations of a complete gamma ray system designed to derive sub-pixel resolution.

DETAILED DESCRIPTION OF A PREFERRED EMBODIMENT

Figure 1A:
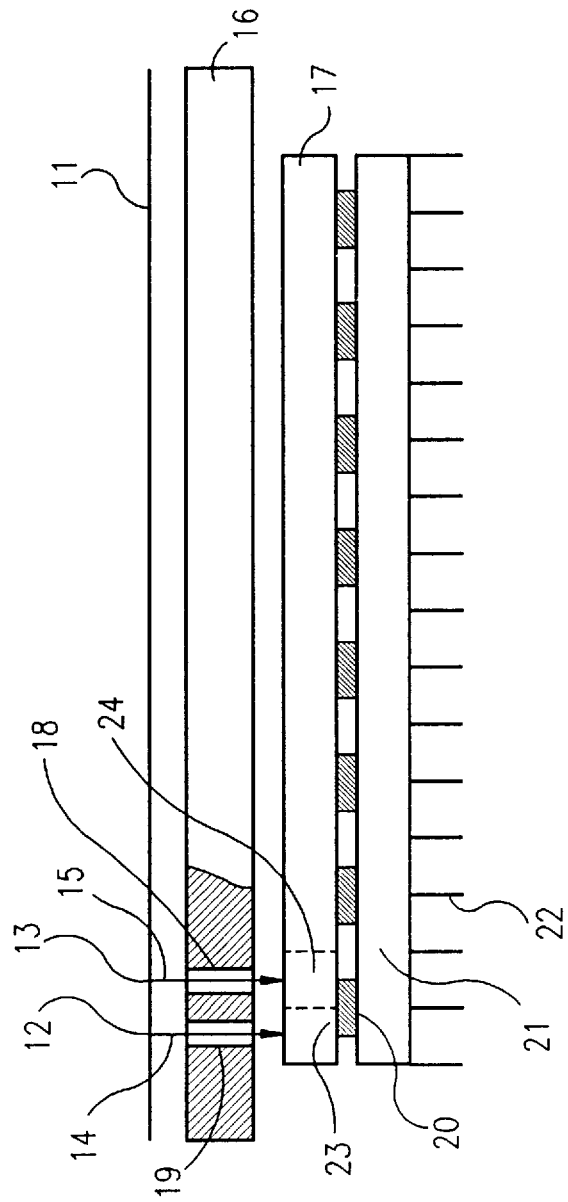
FIGS. 1a and 1b illustrate a schematic side and perspective view of a preferred embodiment of the gamma ray camera of the sub-pixel resolution imaging system, showing an object plane, a collimator plate, an imaging plane and a "chip on board" layer.
Figure 1B:
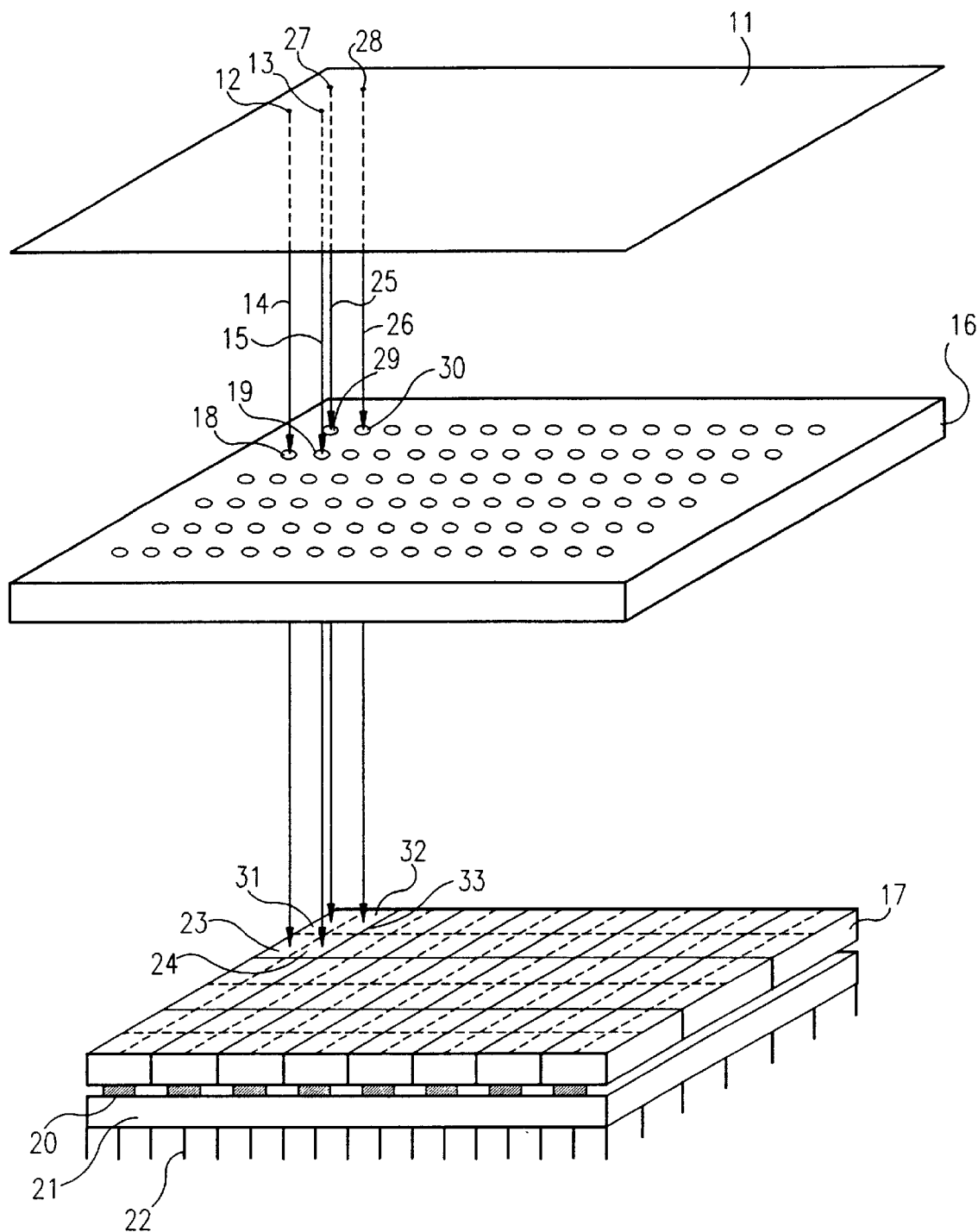

Reference is now made to FIGS. 1a and 1b which illustrate the structure and relative position of several parts of the gamma ray camera with respect to the object plane.

FIG. 1a is a side view of the camera, showing the object plane 11 which represents a gamma emitting object, such as the body of a patient after injection or ingestion of a gamma emitting tracer. Points 12 and 13 represent locations on object 11 from which photons 14 and 15 are emitted. The radiation emitted from object 11 is collimated by collimator plate 16 and is directed towards the imaging plane 17 by holes 18 and 19. Imaging plane 17 is constructed from assemblies of modular arrays of semiconductor gamma ray detectors such as CdTe or CdZnTe. Imaging plane 17 is connected to a "chip on board" IC layer 21 through an array of contacts 20 on the reverse side of the imaging plane substrate. The "chip on board" layer 21 is connected to the other parts and circuits of the camera (not shown) by an array of pins 22.

The gamma radiation from each part of the object is collimated through a hole in plate 16, with a projection onto the imaging plane 17. Each of the virtual pixels contains one of these projections and its surrounding area. Each real pixel contains several virtual pixels 23 and 24. The area of a virtual pixel is defined as the area of a real pixel divided by the number of collimator hole projections falling in its area.

FIG. 1b is a perspective view of the same components shown in FIG. 1a. For the sake of clarity, an exploded view is given. Photons 25 and 26 are emitted from points 27 and 28 of object 11 and are directed towards imaging plane 17 by holes 29 and 30 in collimator plate 16. Photons 14, 15, 25 and 26 hit imaging plane 17 at virtual pixels 23, 24, 31 and 32 respectively.

Imaging plane 17 is divided by solid lines into a matrix of squares, each of which represents a real pixel. Imaging plane 17 is also divided by broken lines into smaller squares each of which represents a virtual pixel corresponding to the projection of one hole in the collimator plate 16. In FIG. 1b, each real pixel, such as 33, contains four virtual pixels 23, 24, 31 and 32. The number of virtual pixels contained in each real pixel varies according to the design of the collimator plate and the size of the real pixel, and is determined primarily by the resolution required by the camera.

Each real pixel is typically connected to the signal input of a channel of an ASIC (Application-Specific Integrated Circuit) mounted in a "chip on board" package. Each ASIC typically contains an array of low-noise charge sensitive preamplifiers and other analog and digital components. The "chip on board" mounted on the back side of the modular semiconductor detector must be equal in size or smaller than the detector substrate. This limits the minimum size of the real pixel to the area of the smallest single channel signal amplifying and processing circuit that can be produced on the ASIC substrate, including all interconnections.

The division of each real pixel into smaller virtual pixels does not change the performance of the camera when used in the conventional static mode. In this mode of operation, it is impossible to distinguish between the signals produced by the different virtual pixels, because they are all connected to a single electronic measurement channel. This channel measures the total radiation hitting the real pixel and produces an electronic signal proportional to the sum of the radiation incident on all the virtual pixels within that real pixel.

In order to achieve resolution improvement, the camera must be operated in a manner which enables the determination of the signals produced by each individual virtual pixel. The method by which this is done will be explained with reference to FIGS. 2a to 2d.

FIGS. 2a to 2d are top views which show the relative positions of the projections of the holes of the collimator plate (hereinafter called holes for simplicity) and the real and virtual pixels on the imaging plane. Collimator plate 50 is the same as that marked 17 in FIGS. 1a and 1b. The circular holes 51 are arranged in the form of a rectilinear matrix. The collimator plate 50 allows the gamma radiation emitted from the measured object located above it (not shown) to pass through it via the holes 51, and to impinge on the imaging plane 52. The imaging plane 52 lies below the collimator plate 50, and thus can only be seen through the holes in plate 50. For clarity, imaging plane 52 is shown through plate 50, as if plate 50 were transparent.

Imaging plane 52 is divided by solid lines into squares of real pixels such as pixel 53. Virtual pixels, such as pixels 54, 55, 56 and 57 are shown by broken lines. The permitted relative positions between collimator plate 50 and imaging plane 52 are such that each virtual pixel is always completely included within the area of a real pixel. Each real pixel thus contains several virtual pixels (four virtual pixels in this specific example) which have a one-to-one relationship to their corresponding holes in collimator plate 50. Therefore, using this arrangement only, it is impossible to derive the individual signal produced in each virtual pixel. The measured signal of a real pixel such as pixel 53 is the sum of all the signals of the virtual pixels 54 to 57 which it contains.

The holes of plate 50, and therefore also the virtual pixels, are arranged in matrix form with row index i and column index j. Similarly, the real pixels are also arranged in matrix form with row index k and column index l. The virtual pixels within a real pixel are also arranged as a sub-matrix with u rows and v columns.

The measured signal intensity $I_{k,l}$ on a real pixel k,l is given by:

$$I_{k,l} = \sum_{j=(l-1)\cdot v+1}^{j=l\cdot v} \sum_{i=(k-1)\cdot u+1}^{k\cdot u} \quad (1)$$

where $X_{ij}$ is the signal intensity developed on the virtual pixel i,j

The total intensity $I^{k,l}$ produced by real pixel k,l is the sum of the intensities produced by the virtual pixels within that pixel, i.e., the sum over a sub-matrix of order u x v within the real pixel k,l. The first virtual pixel in the sub matrix of real pixel k,l , at which the summation of equation (1) is begun is [(k−1) u+1, (l−1) v+1]. Similarly the last virtual pixel in the sub matrix of real pixel k,l, at which the summation of equation (1) ends, is (k u,j v). This means that the summation for each real pixel includes u×v terms of the intensities $X_{ij}$.

If the matrix of the real pixels in imaging plane 52 is of order m×n, i.e., k=1 . . . m and l=1 . . . n, m×n values of the intensities $I_{k,l}$ of the real pixels can be measured. There are, however, (m×n) (u×v) unknown intensities, $X_{ij}$ of the virtual pixels in the imaging plane, equal to the number of holes in collimator plate 50. The number of unknown intensities, $X_{ij}$ is, therefore, larger than the number of measured values, or, in mathematical terms, the number of unknowns is larger than the number of independent equations for solving for these unknowns. Consequently, it is impossible to derive the values of the intensities, $X_{ij}$ of the virtual pixels.

These intensities can only be derived if the number of independent equations can be increased so as to become equal to the number of unknowns. This can be achieved by making multiple measurements (image acquisitions) with the holes 51 of collimator plate 50 in different positions relative to the real pixels of imaging plane 52.

The holes 51 in collimator plate 50 (or equivalently, the virtual pixels 54 to 57 in imaging plane 52) and the real pixels 53 are arranged in two grids having different periodicity. Each period of the real-pixel grid contains u grid periods of holes along the X direction and v grid periods in the Y direction. The common periodicity of the two grids equals the periodicity of the grid of the real pixels The measurements are conducted with different relative shifts between imaging plane 52 and collimator plate 50. The relative shifts are such that the total shift is equal to the grid period of the real pixels. The size of each step is made equal to the grid period of the holes in collimator plate 50. If all possible relative shifts within a real pixel are used, u×v different measurements are obtained for each real pixel. Since there are m×n real pixels, all the measurements together provide (m×n )×(a×v ) independent equations. The number of independent equations then equals the number of virtual pixels and the intensities of all of the virtual pixels can thus be derived.

FIGS. 2a to 2d illustrate a series of stepped measurements for deriving the intensities of all of the virtual pixels. In this specific example u=2, v=2, m=4 and n=3. The relative shifts are performed in such a way that, for each position, the upper left corner (for instance) of a real pixel contains the projection of a different collimator hole out of the group of u×v holes of which that real pixel is composed.

To illustrate this procedure, reference is now made to real pixel 53, which contains four virtual pixels 54 to 57. The initial position of real pixel 53 is shown arbitrarily in FIG. 2a, where it includes four collimator holes 51, 58, 59 and 60. FIGS. 2a to 2d illustrate all the four (2×2) possible relative shifts between collimator plate 50 and imaging plane 52 which can provide independent equations.The upper left corner of real pixel 53 contains the projection of hole 51 in the position shown in FIG. 2a, the projection of hole 58 in the position of FIG. 2b, the projection of hole 59 in the position of FIG. 2c and the projection of hole 60 in the position of FIG. 2d. Any more measurements using relative shifts beyond those described above would create shifts larger than the real pixel grid period. This would produce redundant information, resulting in dependent equations.

It is therefore seen that this invention overcomes the main problems of the prior art embodiments brought in U.S. Pat. Nos. 5,340,988 and 5,448,073. In order to overcome the dead area problem, which prevents the stepped motion camera described in U.S. Pat. No. 5,340,988 from being useful for gamma ray imaging, this invention includes an indexing mechanism, either electronic in the case where the imaging plane is shifted relative to the collimator plate, or mechanical in the case where the whole camera is shifted relative to the measured object. The object of this indexing mechanism is to ensure that the virtual pixels never overlap more than one real pixel, and therefore, never fall within the dead area at the pixel edges.

In order to overcome the resolution problem of U.S. Pat. No. 5,448,073, which, because of the large collimator hole size, is limited to the intrinsic detector resolution, this invention adopts the opposite approach, and uses high resolution collimator holes of size smaller than the intrinsic detector resolution. The resolution of the detector is thereby improved, but at the cost of a loss in sensitivity.

A further advantage of this invention is in its ability to nullify detector array defects. Stepped motion measurements conducted at spacings equal to the real pixel pitch cannot achieve sub-pixel resolution. On the other hand such measurements can be very useful for cancelling the effect of defective pixels in the imaging plane. Several images are acquired at positions shifted from each other by amounts equal to an integer times the pixel pitch. The acquired shifted images are shifted back in the electronic processor unit to their initial reference position and the intensities are summed and averaged. In this manner, the problem of defective pixels is reduced, since each element of the object is imaged consecutively by several different pixels and then averaged.

A further advantage of this invention is in its ability to compensate for other potential innaccuracies of the system. For instance, in some of the shifted positions, pixels at the edges of the imaging plane are fully or partly screened by the border of the collimator plate and their signal thus reduced. To compensate for this, it is possible to use a square imaging plane and to acquire the different images by rotation every 90 degrees. The averaged summation of all the acquired images is performed after rotating all those images back to the same initial reference position of the measured object.

Furthermore, collimator plate 50 has a relatively wide border 61 around the region containing the collimator holes. This border prevents the imaging plane 52 from being exposed to any radiation except through the holes in the collimator plate. If some of the pixels (real or virtual) at the edge of the imaging plane 52 are located beneath the border (as shown in FIGS. 2b, 2c and 2d), the measured intensity on them is zero, and integration over all possible locations for the measurements will lead to a lower signal. This means that after deriving the signals of those border virtual pixels, they have to be corrected to compensate for the time they were screened by the collimator plate.

Figure 2A:
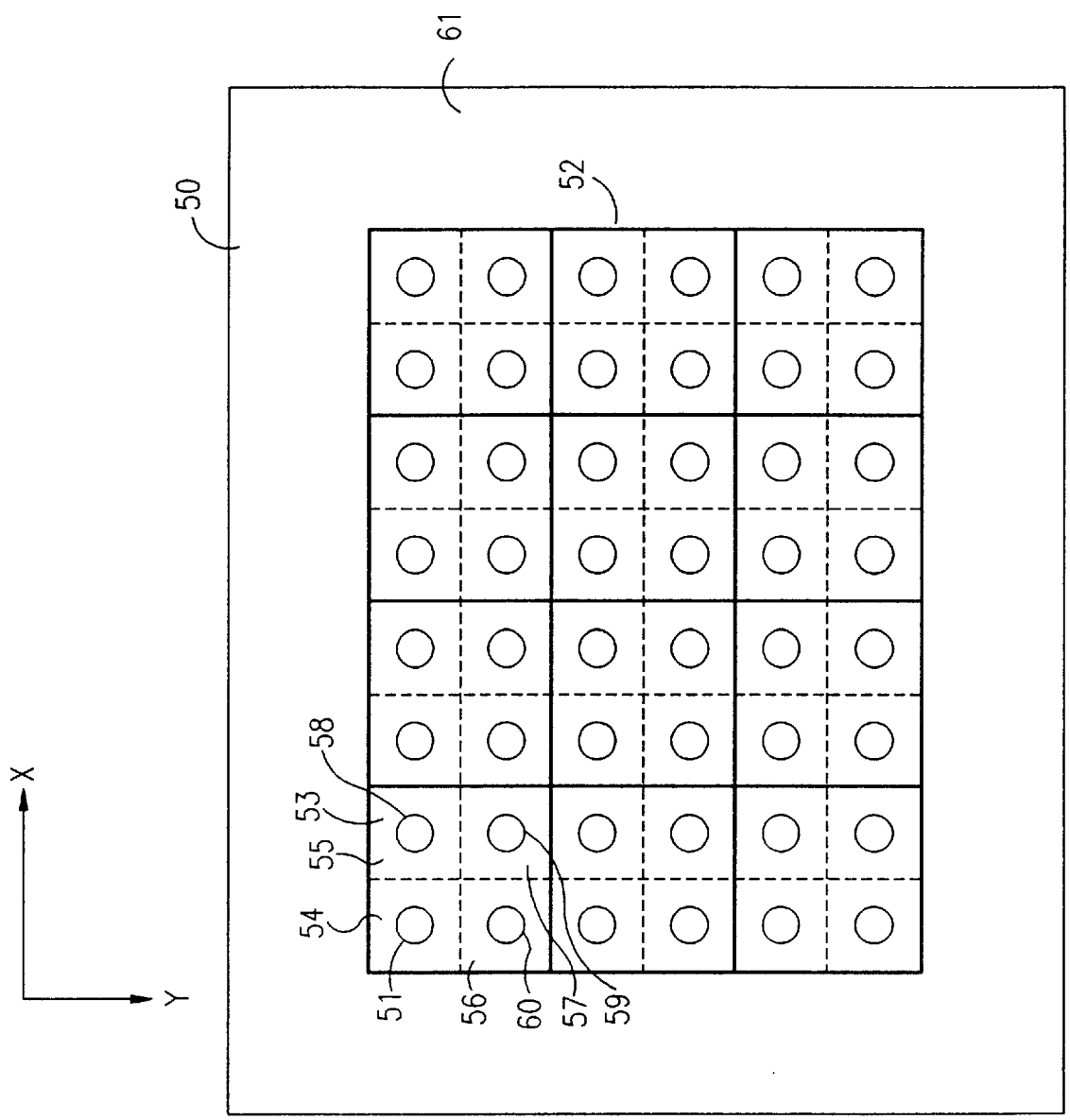
Figure 2B:
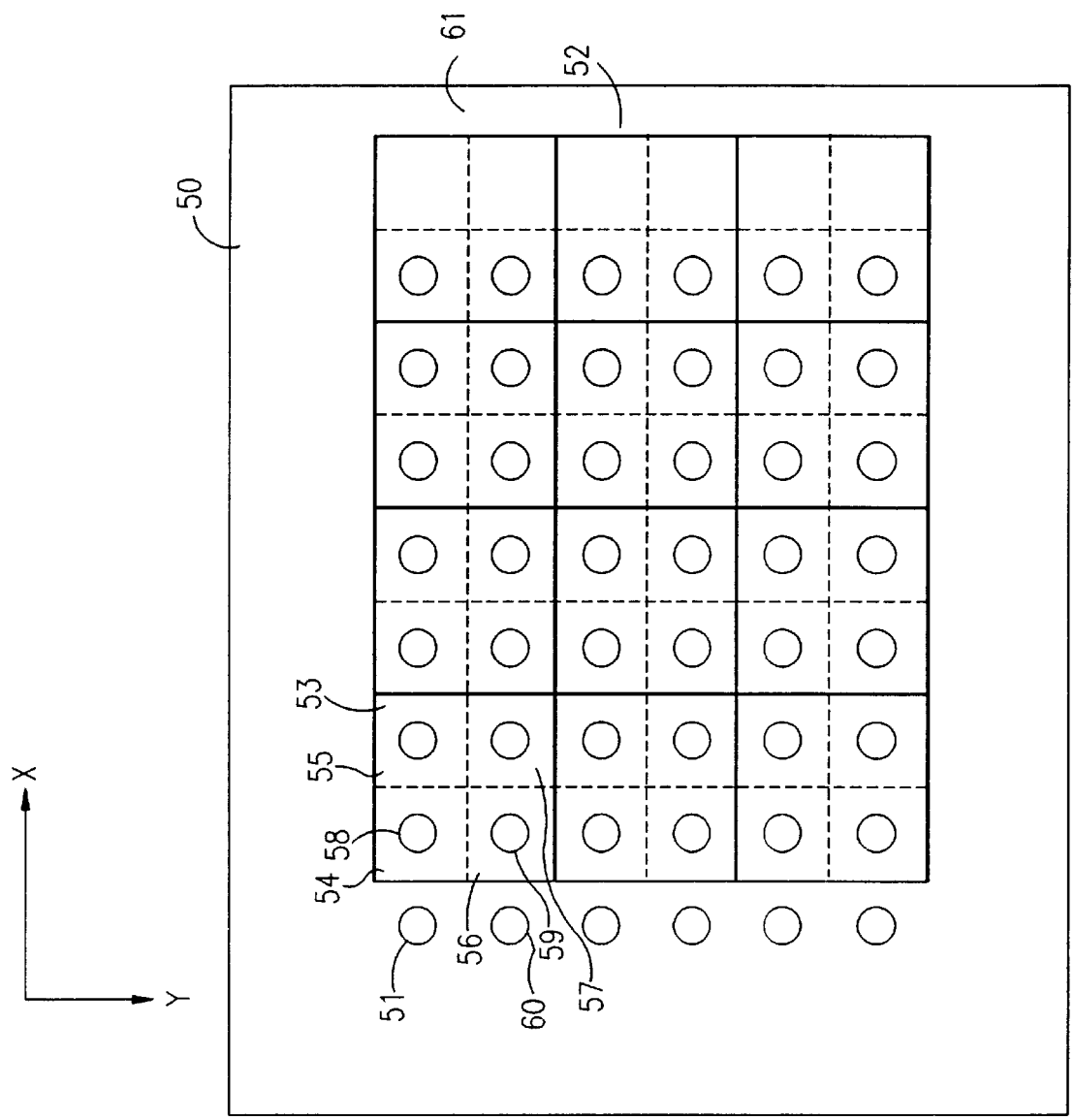

FIG. 2a shows imaging plane 52 with 4×3=12 real pixels and 48 virtual pixels, the same as the number of the holes in collimator plate 50. The system of FIG. 2a produces 12 independent equations for each of the measurements illustrated in FIGS. 2a to 2d (the same as the number of the real pixels). Since there are 4 independent shifted positions of plate 50 and plane 52 at which measurements are conducted, a total of 12×4=48 independent equations are obtained. Since the number of independent equations equals the number of virtual pixels, the intensity of each of the virtual pixels can be derived either mathematically or numerically, with consequent improved image resolution.

The general mathematical expression for the set of all the independent equations is given by:

$$I_{K,L}^{p,q} = \sum_{p=1}^{p=v} \sum_{p=1}^{p=u} \sum_{j=(L-1)\cdot v+q+I}^{j=L\cdot v+q} \sum_{i=(K-1)\cdot u+p+1}^{K\cdot u+p} X_{i,j} \qquad (2)$$

where the indices p and q of the intensities $I_{K,L}^{p,q}$ measured on real pixel K,L, indicating the relative shifts between the collimator plate 50 and the imaging plane 52, are measured in units of the hole pitch in collimator plate 52 along the X and Y directions respectively. The above equation represents K×L×p×q independent-equations. For the previously discussed example K=1, 2, 3, 4, L=1, 2, 3, p=1,2, q=1,2 and thus the number of independent equations that can be written according to the equation above is 4×3×2×2=48, as derived previously and equals to the number of virtual pixels.

The technique discussed above uses relative shifts between the collimator plate and the imaging plane. These relative shifts alternately locate the virtual pixels at different positions with respect to the projection of the holes in plate 50, and consequently, with respect to specific parts of the object.

The relative shifts between the virtual pixels of the imaging plane and the elements of the object can also be produced by moving the object relative to the complete camera whilst the collimator plate and the imaging plane are fixed relative to each other, or vise versa, by keeping the measured object static whilst moving the imaging plane along with the collimator plate.

Figure 3A:
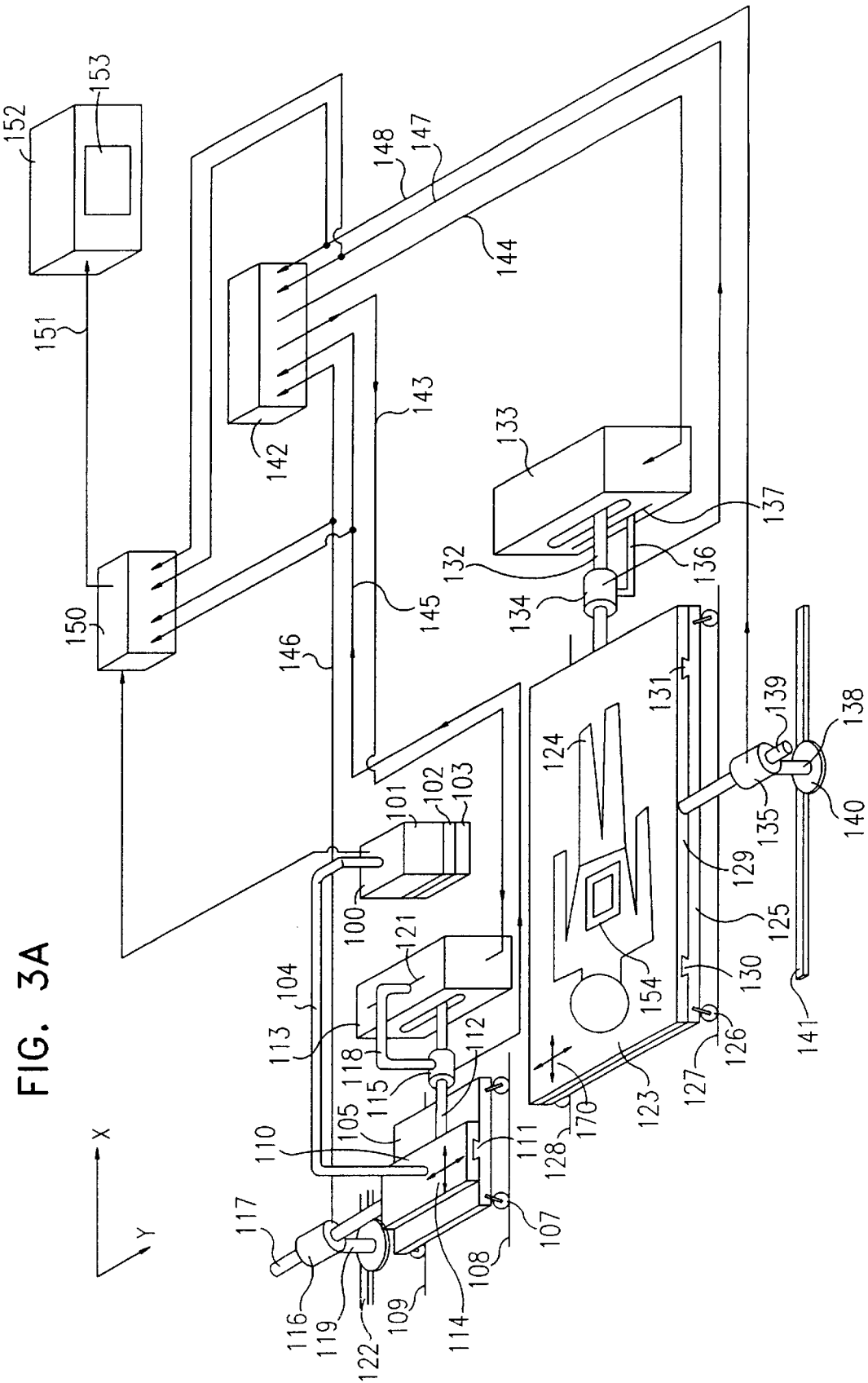

Reference is now made to FIGS. 3a and 3b, which show schematic configurations of a complete gamma ray system designed to derive sub-pixel resolution. The two preferred embodiments illustrate the two different methods of achieving relative shifts between the imaging plane and the object. FIG. 3a is a view of the system where there is no relative movement between the imaging plane and the collimator plate. FIG. 3b shows a system similar to that of FIG. 3a, except that the collimator plate is kept static, and the other parts of the camera move.

Camera assembly 100, comprising an electronics box 101, imaging plane 102 and collimator plate 103, is mounted on supporting arm 104 that is connected to a base 105, capable of moving in two dimensions, X and Y. Movement of the base 105 in the X direction is effected by means of wheels 107 mounted on rails 108 and 109. The upper part 110 of base 105 moves in the Y direction on the slide 111.

The base 105 is connected by means of arm 112 to drive unit 113. Drive unit 113 is one of many known systems used to drive stages and to produce controlled two dimensional motion. Drive unit 113 can be a mechanical, electromagnetic, pneumatic or piezo-electric motion system, which moves arm 112 in X and Y directions or any combination thereof The two dimensional motion of arm 112 is transferred by base 105 to supporting arm 104 and thus to camera 100. The two dimensional motion (planar motion) of base 105 is illustrated by the group of arrows 114.

The X-axis motion of camera 100 is measured by position sensor 115 mounted on arm 112. Position reader 115 is a capacitive, optical, electro-magnetic or mechanical linear encoder. The Y-axis motion of camera 100 is measured by position sensor 116 mounted on arm 117. Position sensor 115 is supported by arm 118 connected to drive unit 113 through a slot 121 which allows motion in the Y direction. Similarly position sensor 116 is supported by arm 119 connected to base 120 which allows motion in the X direction along rail 122.

Platform 123 is designed to carry gamma emitting object 124, such as a human body as schematically illustrated. Lower plate 125 of platform 123 can be moved in the X direction on wheels 126 mounted on rails 127 and 128.

Upper plate 129 of platform 123 can be moved in the Y direction on slides 130 and 131. Platform 123 is connected by means of arm 132 to drive unit 133, which imparts two dimensional motion to the platform. This motion is indicated by the group of arrows 170.

Position sensors 134 and 135 (similar to sensors 115 and 116) measure the motion of platform 123 in the X and Y directions, respectively. Position sensor 134 is mounted on arm 136 that is connected to drive unit 133 through slot 137 to allow motion in the Y direction. Position sensor 135 is mounted on arm 138 and measures the motion of platform 123 in the Y-direction. Arm 138 is connected to base 140, which allows motion in the X direction along rail 141.

Driver units 113 and 133 are controlled by controller 142 through its outputs 143 and 144. Outputs 145, 146, 147 and 148 of position sensors 115, 116, 134 and 135, respectively are fed to controller 142, to provide closed loop control of the camera 100 and platform 123 positions. Output 149 of camera 100 and outputs 145, 146, 147 and 148 of position sensors 115, 116, 134 and 135 respectively are fed into computer 150. Computer 150 provides output 151 that is fed into monitor 152 to display an image 153 of object 124. Data transfer to and from the computer may be in serial or parallel form.

The object of the motion system is to provide relative motion between imaging plane 102 and object 124. To achieve control of this motion, controller 142 can be activated in one of several modes. It can actuate drive unit 113 for moving camera 100 only, or drive unit 133 for moving object 124 only, or it can activate both drive units simultaneously for moving both camera and object. The relative motion can be either continuous or in steps.

Computer 150 performs multiple functions. The first function is the image-processing of the output 149 of camera 100. It can also include a Multi Channel Analyzer unit (also known as a Pulse Height Analyzer unit) for energy selection of the signals produced by the detectors in imaging plane 102. A further function is to synchronize between the above mentioned imaging plane and object positions, and to correlate this relative motion with the images acquired at the pre-defined locations. Computer 150 is also used to construct a set of independent equations according to equation number (2) and to solve them, either by numerical iteration, but more effectively by arranging them in matrix form and solving them by an analytical computation method, such as Kramer's formulae. The resulting values of the unknowns $X_{ij}$ are then used to display a high resolution image.

FIG. 3b shows a system similar to the system of FIG. 3a and thus the same numbers are used to indicate common components. The difference between the two embodiments is only in the way in which the collimator plate 103 is mounted. In the system of FIG. 3a, collimator plate 103 is maintained in a fixed position relative to the imaging plane. In the version of FIG. 3b, collimator plate 103 is mounted separately from the imaging plane on an arm 160 connected to a static base plate 161. The imaging plane is thus allowed to move relative to the object whilst the collimator plate is held static.

Frame 154 is made of lead and has a clear window and a wide border. It is placed on object 124 to define a region of interest within the frame to be imaged in the camera 100, and to prevent radiation emitted from outside this region of interest from getting to the camera. The function of this frame will now be explained hereinunder.

In order to ensure that the set of independent equations (2) remain soluble, it is important to prevent the creation of additional unknowns $X_{ij}$, which would make their number larger than the number of the independent equations. This means that information from outside of the region of interest must be excluded in the imaging process. In the situation where the information necessary for sub-pixel resolution is acquired by imaging with relative motion between the imaging plane and the collimator plate, as described by FIGS. 2a to 2d, the border of the collimator plate fulfills this function. The movements made in going from the situation in FIG. 2a to any of FIGS. 2b to 2d do not entail the addition of any further unknowns in the form of additional parts of the object exposed to the imaging plate, because of the blocking action of the border of the collimator plate. This is the situation existent in the system described in FIG. 3b, and there is then no need to use frame 154 in front of object 124.

In the situation existent in the system described by FIG. 3a, where there is no relative motion between the imaging plate and the collimator plate, any motion of the object would expose new areas to the imaging plate, leading to an excess of unknowns. Therefore, the use of frame 154 is essential to prevent any radiation emitted from outside of the region of interest on object 124 from reaching imaging plane 102.

In any of the above modes of operation, the relative shifts can be performed step by step with no relative motion during image acquisition, or they can be performed "on the fly", where the relative motion is made continuous and correlated with the image acquisition system, such that the measurements are done in the vicinity of the right positions during motion.

The motion path can be performed once only, or it can be repeated periodically for integrating the signals to improve signal to noise ratio and to average out time-independent phenomena.

It will be appreciated by person skilled in the art that the present invention is not limited by what has been particularly shown and described herein above. Rather the scope of the present invention includes both combinations and sub-combinations of various features described hereinabove as well as variations and modifications thereto which would occur to a person of skill in the art upon reading the above description and which are not in the prior art.

We claim:

1. A gamma-ray imaging system for producing high resolution images, comprising:
   (a) a collimator plate having multiple holes for collimating gamma photons emitted from an object to be imaged;
   (b) a gamma detector pixel array located in an imaging plane, comprising a plurality of pixels having predetermined pitch between pixels, each pixel operative to convert the gamma photons directly into electrical signals which comprise the image data, said multiple holes in the collimator plate being smaller in diameter than half the pitch between the pixels, and being arranged in a spatial periodic structure such that the pitch between the pixel contains two or more periods of the holes in the spatial periodic structure;
   (c) an actuator for producing relative movement between the object to be imaged and the gamma detector pixel array in the imaging plane to successive predetermined imaging positions, the distance between each successive predetermined imaging position being equal to the pitch of the spatial periodic structure of the holes in the collimator plate,
   (d) an electronic controller for controlling the relative movement between the object to be imaged and the gamma detector pixel array according to a predetermined program, said multiple holes and said successive predetermined imaging positions being arranged so that the photons emerging from each hole at each imaging position produce discrete multiple irradiated regions on the pixels outside dead areas at the edges of the pixels;
   (e) an electronic signal measurer for measuring at each successive predetermined imaging position the electrical signals produced by the pixels of the gamma detector pixel array, and
   (f) an electronic processing unit for processing the electrical signals produced by the pixels of the gamma detector pixel array at each successive predetermined imaging position by constructing a set of independent equations equal to the number of said irradiated regions, accurately solving the set of independent equations to derive a data value of the electrical signals corresponding to each of the irradiated regions, and using the data values to compose and display an image of the object.

2. A system according to claim 1 wherein the electronic signal measurer measures the electrical signals produced by the pixels by means of single photon counting corresponding to a predetermined energy range.

3. A system according to claim 2 wherein the collimator plate has borders without holes.

4. A system according to claim 3 wherein the object is a human body after treatment with a gamma emitting tracer material.

5. A system according to claim 4 wherein the imaging plane comprises arrays of modular detectors assemblies.

6. A system according to claim 5 wherein each modular detector includes a "chip on board" package comprising at least one ASIC.

7. A system according to claim 1 wherein the material of the detector pixel array is CdTe.

8. A system according to claim 1 wherein the material of the detector pixel array is CdTe.

9. A system according to claim 1 wherein the actuator for producing relative movement comprises a motor.

10. A system according to claim 6 wherein said actuator for producing relative movement does so when the collimator plate is attached to the gamma ray imaging system so that it moves together with the imaging plane.

11. A system according to claim 10 wherein the actuator for producing relative movement does so when said object is in a static position.

12. A system according to claim 10 wherein said actuator for producing relative movement does so when said imaging plane is in a static position.

13. A system according to claim 10 wherein said actuator for producing relative movement does so when said imaging plane and said object are both moving.

14. A system according to claim 6 wherein said actuator for producing relative movement does so when the collimator plate is kept in a static position.

15. A system according to claim 14 wherein the actuator for producing relative movement does so when said object is in a static position.

16. A system according to claim 14 wherein said actuator for producing relative movement does so when said imaging plane is in a static position.

17. A system according to claim 14 wherein said actuator for producing relative movement does so when said imaging plane and said object are both moving.

18. A system according to claim 1 wherein the relative movement is controlled by a closed loop electronic control system.

19. A system according to claim 18 wherein the closed loop electronic control system includes a position reader that feeds a controller for controlling the actuator for producing relative movement.

20. A system according to claim 1 wherein the actuator for producing the relative movement includes a moveable platform.

21. A system according to claim 20 wherein the platform is arranged to carry a human body.

22. A system according to claim 1 wherein said relative movement is produced by means of discrete step motion between said successive predetermined imaging positions.

23. A system according to claim 1 wherein said relative movement is produced by means of continuous motion between said successive predetermined imaging positions.

24. A system according to claim 1 wherein the path of the relative movement between the object to be imaged and the gamma detector pixel array is repeated periodically and the resultant images integrated in order to improve signal to noise ratio, and to average out time-independent phenomena.

25. A system according to claim 1 wherein the set of independent equations is solved numerically.

26. A system according to claim 25 wherein the numerical solution is performed by a microprocessor.

27. A system according to claim 25 wherein the numerical solution is performed by a computer.

28. A system according to claim 1 wherein a region of interest is defined on the object.

29. A system according to claim 28 wherein the region of interest is defined by the window of a frame placed between the object and the collimator plate in the vicinity of the object.

30. A system according to claim 29 wherein the frame is made of lead.

31. A system according to claim 1 wherein the signals of the irradiated regions are corrected in the processing unit to compensate for the time that they are screened by the borders of the collimator-plate.

32. A gamma-ray imaging system for producing high resolution images, comprising:

(a) a collimator plate having multiple holes for collimating gamma photons emitted from an object to be imaged;

(b) a gamma detector pixel array located in an imaging plane, comprising a plurality of pixels having predetermined pitch between pixels, each pixel operative to convert the gamma photons directly into electrical signals which comprise the image data, said multiple holes in the collimator plate being smaller in diameter than half the pitch between the pixels, and being arranged in a spatial periodic structure such that the pitch between the pixels contains two or more periods of the holes in the spatial periodic structure;

(c) an actuator for producing relative movement between the object to be imaged and the gamma detector pixel array in the imaging plane to successive predetermined imaging positions, the distance between each successive predetermined imaging position being equal to an integral number times the spatial period of the pixels;

(d) an electronic controller for controlling the relative movement between the object to be imaged and the gamma detector pixel array according to a predetermined program, said multiple holes and said successive predetermined imaging positions being arranged so that the photons emerging from each hole at each imaging position produce discrete multiple irradiated regions on the pixels outside dead areas at the edges of the pixels;

(e) an electronic signal measurer for measuring at each successive predetermined imaging position the electrical signals produced by the pixels of the gamma detector pixel array, and (f) an electronic processing unit for processing the electrical signals produced by the pixels of the gamma detector pixel array at each successive predetermined imaging position by constructing a set of independent equations equal to the number of said irradiated regions, accurately solving the set of independent equations to derive a data value of the electrical signals corresponding to each of the irradiated regions, and using the data valves to compose and display an image of the object, images acquired at each successive predetermined position being summed and averaged after being referred back electronically to an initial reference positions.

33. A gamma-ray imaging system for producing high resolution images, comprising:

(a) a collimator plate having multiple holes for collimating gamma photons emitted from an object to be imaged;

(b) a gamma detector pixel array located in an imaging plane, comprising a plurality of pixels having predetermined pitch between pixels, each pixel operative to convert the gamma photons directly into electrical signals which comprise the image data, said multiple holes in the collimator plate being smaller in diameter than half the pitch between the pixels, and being arranged in a spatial periodic structure such that the pitch between the pixel contains two or more periods of the holes in the spatial periodic structure;

(c) an actuator for producing relative movement between the object to be imaged and the gamma detector pixel array in the imaging plane to successive predetermined imaging positions, the distance between each successive predetermined imaging positions being equal to the pitch of the spatial periodic structure of the holes in the collimator plate;

(d) an electronic controller for controlling the relative movement between the object to be imaged and the gamma detector pixel array according to a predetermined program, said multiple holes and said successive predetermined imaging positions being arranged so that the photons emerging from each hole at each imaging position produce discrete multiple irradiated regions on the pixels outside dead areas at the edges of the pixels;

(e) an electronic signal measurer for measuring at each successive predetermined imaging position the electrical signals produced by the pixels of the gamma detector pixel array;

(f) an electronic processing unit for processing the electrical signals produced by the pixels of the gamma detector pixel array at each successive predetermined imaging position by constructing a set of independent equations equal to the number of said irradiated regions, accurately solving the set of independent equations to derive a data value of the electrical signals corresponding to each of the irradiated regions, and using the data values to compose and display an image of the object, and (g) a rotator for rotating the gamma detector pixel array about an axis through its center operative to acquire images at positions rotationally shifted relative to each other by 90 degrees, the images being summed and averaged after being referred back electronically to an initial reference position.

* * * * *